United States Patent [19]

Donato

[11] 4,109,532

[45] Aug. 29, 1978

[54] APPARATUS FOR DETERMINING THE AMOUNT AND LOCATION OF UNBALANCE IN A ROTATING WHEEL OF A VEHICLE

[76] Inventor: Giuseppe Donato, Via Mac Mahon, 77, Milan, Italy

[21] Appl. No.: 687,115

[22] Filed: May 17, 1976

[30] Foreign Application Priority Data

May 23, 1975 [IT] Italy .............................. 23681 A/75

[51] Int. Cl.² .......................................... G01M 1/28
[52] U.S. Cl. .................................................... 73/457
[58] Field of Search ................. 73/457, 466, 467, 462

[56] References Cited

U.S. PATENT DOCUMENTS

| 2,341,444 | 2/1944 | Hunter | 73/457 |
|---|---|---|---|
| 2,344,349 | 3/1944 | Forster | 73/457 |
| 2,695,516 | 11/1954 | Petroff | 73/457 |
| 2,882,034 | 4/1959 | Wuerth | 73/503 X |
| 3,078,720 | 2/1963 | Hofmann | 73/457 |
| 3,678,761 | 7/1972 | Blackburn | 73/457 |
| 3,729,996 | 5/1973 | Metz | 73/231 R |
| 3,732,737 | 5/1973 | Forster | 73/462 |

*Primary Examiner*—James J. Gill
*Attorney, Agent, or Firm*—Guido Modiano; Albert Josif

[57] ABSTRACT

An apparatus for determining the amount and location of unbalance in a rotating wheel of a vehicle, of the type effecting the determination of balancing with the wheels mounted on the vehicle comprising a mechanical pulse detecting means effective, when suitably positioned close to a rotating unbalanced wheel, to receive a mechanical pulse at each revolution thereof and effective to convert said mechanical pulse into a corresponding unbalance electrical pulse, an unbalance indicating means circuit connected to the detector means to receive therefrom, at each revolution of the wheel, the unbalance electrical pulse. The indicating means is effective to store the electrical pulse from the detector means corresponding to the maximum unbalance of the wheel. An unbalance position detecting means is provided to receive therefrom, through control circuit means, unbalance electrical pulses corresponding to the mechanical pulses and adapted to be activated by the electrical pulses and to cooperate operatively with the unbalance indicating means to display the location of the unbalance in the wheel. The apparatus further comprises unbalance location indicating means adapted to be removably associated with the wheel and to cooperate with the activated unbalance location detecting means and with the unbalance indicating means, thereby determining the location of the unbalance in the wheel, and display means effective to display the precise location of the unbalance in the wheel as indicated by the unbalance location indicating means.

2 Claims, 3 Drawing Figures

APPARATUS FOR DETERMINING THE AMOUNT AND LOCATION OF UNBALANCE IN A ROTATING WHEEL OF A VEHICLE

BACKGROUND OF THE INVENTION

This invention relates to an apparatus for determining the amount and location of unbalance in rotating vehicle wheels, and more particularly to a balancing apparatus of the type whereon such wheels can be balanced without removing them from the vehicle.

It is currently known to balance a road vehicle wheel by using two different types of apparata. With one apparatus, the wheel is balanced separately from the vehicle proper, whereas with the other apparatus the wheel is balanced while mounted to the vehicle at its natural operative location. Since, with the latter type of apparatus, the wheels are balanced at their natural location and in a nearly actual operation condition, such an apparatus is to be considered more accurate. Indeed, since on the former type of apparatus the wheels are balanced after removal from the vehicle, on re-installing them on the vehicle, owing to the gravitational force, they take up a different mounting position with respect to the rotation center when they were pivoted on the balancing apparatus, this new position causing unbalance. Furthermore, those parts which rotate together with the wheels are not balanced, and this further aggravates the unbalance situation. In spite of their balancing inaccuracy, those apparata which balance removed wheels are still widespread and currently marketed on account of the fact that those apparata which balance wheels in their mounted condition are difficult to use and time consuming. Thus, the need is felt in this field for a mounted wheel balancing machine which, while retaining the accuracy feature mentioned above, is capable of eliminating those operational difficulties to make the balancing step a simple and straightforward one, without requiring a qualified operator, and this at reduced operation times.

The apparata for balancing wheels while mounted to a road vehicle, although differing somewhat in design, are all based on the same principle, and the balancing operation is basically the same: the wheel to be balanced is lifted off the ground or floor by means of a jack placed under the vehicle, and an indexing mark is applied, with a piece of chalk or adhesive tape, to any point of the tire outer flank, such index being often taken to be the inflation valve itself. A pulse detector or pick-up is then placed under the vehicle as near as possible to the wheel to be balanced; some detectors have one end resting on the ground or floor surface and the other contacting the vehicle, others do not rest on the ground or floor but remain attached to the vehicle through the action of a magnet, and others still are incorporated in the jack itself. The detector is connected to the balancing machine, comprising generally an unbalance indicating gauge and a stroboscopic lamp, and the wheel to be balanced, when an idle one, is caused to rotate by means of a pulley drive, and when a drive one, by means of the vehicle own engine. If the wheel is out of balance, the detector beneath the vehicle receives a blow at each revolution when the unbalanced portion, and accordingly heavier portion, is at its lowest point, that blow, after being converted into an electric pulse, being transferred to the stroboscopic lamp and gauge; the former lights up and, by the stroboscopic effect, shows the wheel as if it were stationary, and the latter indicates the amount of unbalance which varies according to the wheel rotational speed; the position of the indexing mark applied to the wheel is then observed at the precise moment that the gauge shows maximum unbalance. After such readings have been taken, the wheel is stopped and the indexing mark applied to the wheel is moved to the location whereat it was observed at the moment of maximum unbalance, while to the topmost or 12 o'clock portion of the wheel a counterweight is applied in the amount indicated by the gauge. It will be apparent that with this balancing method it is necessary to take simultaneously two different readings which are away from each other and moving, since both the gauge pointer and the wheel mark vary simultaneously as the speed varies.

It is this necessity of observing two points away from each other that makes the balancing operation a difficult one. In the case of the drive wheels, an additional drawback resides in the fact that an assistant has to be available for starting the vehicle engine and throttle up or down as necessary while the ground operator reads the gauge and mark on the wheel.

SUMMARY OF THE INVENTION

In order to obviate such drawbacks as set forth hereinabove, a photoelectric cell device has been adopted wherein, additional to the detector or virbration pick-up located under the vehicle, a photoelectric cell detector is placed opposite the wheel to be balanced which, when the mark applied to the wheel with chalk or other suitable material detectable by the cell passes by, will detect it and send a pulse to a 0–360° scale gauge mounted to the balancing machine, whereon the maximum unbalance position is read; a further gauge will show the amount of unbalance. This device or system is undoubtedly more effective since it eliminates the operational difficulty. On the 0–360° gauge which detects the maximum unbalance position, there is arranged a storage unit which stores the unbalance position. After stopping the wheel, the mark is brought before the cell, and at the point related to the wheel as shown on the gauge, the counterweight is applied. This system obviates the problem of difficult operation: it is no longer necessary to read two gauges, but rather one, i.e. the weight gauge, since the counterweight location gauge reading is stored in the 0–360 gauge. One operator is enough for the balancing operation, since owing to the weight indicating gauge housing being orientable, in the case of the drive wheels, the operator aboard the vehicle is enabled to rotate the wheel to be balanced and at the same time watch the gauge. However, the synchronization of the 0–360° gauge with the wheel is difficult technically. Moreover, the balancing operation requires considerable time because after stopping the wheel, the mark must be brought each time before the cell and the counterweight placed at the point referred to the wheel and shown on the gauge. There exist also balancing devices wherein to the wheel to be balanced is applied a disc wherewith a movable mechanical means is associated which, by centrifugal effect, and based upon the unbalance, stops at the ubalance point thus evidencing it. But even these devices have failed to provide satisfactory results, and have been abandoned in practice. In the light of the above, it is a primary object of the invention to provide a mounted wheel balancing apparatus, which is extremely functional and simple to operate and makes the balancing operation an elementary one and one that can be handled by any operator, even a not qualified one, while reducing at the same time the balancing time.

It is another object of the invention to provide a balancing apparatus wherein the balancing operation may be quickly carried out by a single operator.

It is a further object of this invention to provide a balancing apparatus which is capable of determining with extreme accuracy the attachment location for the counterweight, and of being easily modified such as to eliminate, if desired, the necessity for the stroboscopic lamp.

Yet another object of the invention is to provide a balancing apparatus which is specially economical.

A further object of the invention is to provide a balancing apparatus, wherein for the balancing of a wheel a single gauge reading may suffice.

These and other objects, such as will be more apparent hereinafter, are achieved by a vehicle wheel balancing apparatus, of the type effecting the balancing with the wheels mounted to the vehicle, comprising mechanical pulse pick-up means effective, when suitably positioned close to a rotating unbalanced wheel, to receive a mechanical pulse at each revolution thereof and effective to convert said mechanical pulse into a corresponding unbalance electrical pulse, unbalance indicating means circuitally connected to said detector means to receive therefrom, at each revolution of said wheel, said unbalanced electrical pulse, said indicating means being effective to store the electrical pulse from said pick-up means corresponding to the maximum unbalance of said wheel, unbalance position detecting means circuitally connected to said pick-up means to receive therefrom, through control circuit means, unbalance electrical pulses corresponding to said mechanical pulses and adapted to be activated by said electrical pulses and to cooperate operatively with said unbalance indicating means to display the location of said unbalance in said wheel, said apparatus being characterized in that it further comprises unbalance location indicating means adapted to be removably associated with said wheel and to cooperate with said activated unbalance location detecting means and with said unbalance indicating means, thereby determining the location of said unbalance in said wheel, and display means effective to display the precise location of said unbalance in said wheel as indicated by said unbalance location indicating means.

BRIEF DESCRIPTION OF THE DRAWINGS

The invention will be further described with reference to two embodiments thereof, illustrated by way of example and not of limitation in the accompanying drawing, wherein.

DESCRIPTION OF PREFERRED EMBODIMENTS

Figure 1:
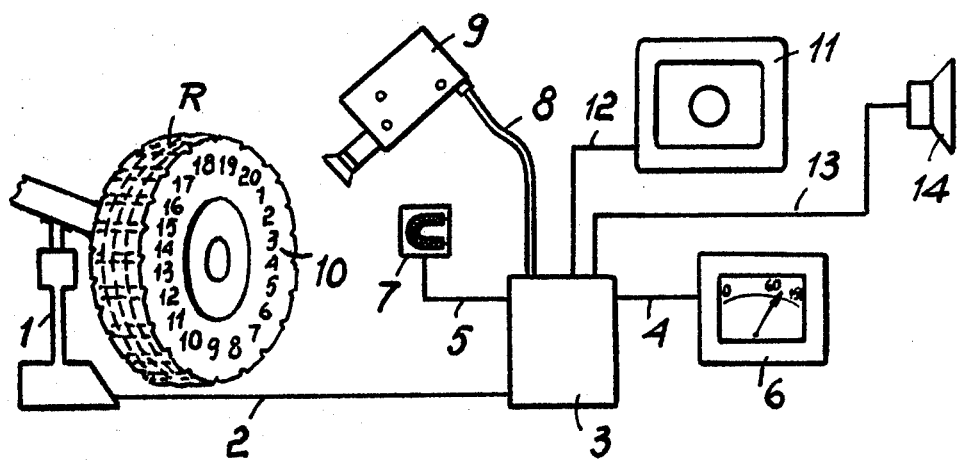
FIG. 1 is a block diagram of a first embodiment of the balancing apparatus according to the teachings of this invention.

With reference to the cited figures of the drawing, and in particular to FIG. 1, the first embodiment of the balancing apparatus according to the invention comprises a detector member or pick-up 1 suitably located close to the wheel R to be balanced and which, as mentioned previously, receives a blow at each revolution of the wheel that is then converted into an electrical pulse. Such electrical pulses are transmitted, through the line 2, to a body 3 enclosing the apparatus control circuitry (not shown), which after suitably processing said electrical pulses sends them over the lines 4 and 5, respectively, to an unbalance indicating gauge 6 and stroboscopic lamp 7. Most advantageously, the gauge 6 stores the point of maximum unbalance, and the stroboscopic lamp 7 is controlled to light up only at that instant and for the duration of that unbalance, and will go off as the speed is decreased or increased, thus introducing unbalance levels which are lower than the maximum.

The control logics within the body 3 also controls, through a coaxial cable 8, a TV camera 9 directed onto a laminar ring member, e.g. of paper or other material 10, removably attached to the wheel R being balanced. It will be noted that the traditional indexing mark applied with chalk for determining the unbalance position, has been replaced with said laminar ring member 10, according to the invention, and a plurality of figures (which might be letters or other characters) has been marked thereon, arranged close together such as to occupy substantially the entire periphery of the wheel R being balanced. In this manner, it will be apparent that the degree of accuracy achieved is appreciably higher. To the TV camera 9, a video display or cathode ray monitor is associated, as indicated with reference numeral 11, which is also controlled by the machine circuitry through the line 12. In order to call the operator's attention and avoid the necessity for him to constantly watch the video display 11, the machine circuitry additionally controls through the line 13 a loudspeaker 14 which, at the instant of maximum unbalance, will supply a sound signal. Furthermore, it is contemplated, in order to eliminate the necessity for the operator to watch the whole wheel lighted by the stroboscopic lamp 7, the application to the latter of a lens or stop (not shown) which will provide a flat, blade-like beam of light illuminating but one figure or character. The expert in the art will immediately perceive the operating principle of this embodiment of the inventive balancing apparatus. It may be enough to add that, once the figure or character has been detected at the moment of maximum unbalance, the wheel is stopped, and directly to the location on the wheel where the figure or character has been detected, a counterweight will be applied the amount whereof has been stored, in a known manner, in the indicating gauge. For an idle wheel, the figure or character reading may be effected visually, whereas for a drive wheel, the TV camera is necessary since, once it has been directed toward the operator in the vehicle, the operator will be enabled to read the figure or character unaided, by watching the monitor. Obviously, the TV camera could be eliminated by using mirrors or prisms, located in front of the wheel, which, after being suitably oriented, would permit the operator in the vehicle to see the wheel and detect the figure or character at the moment of maximum unbalance.

Figure 2:
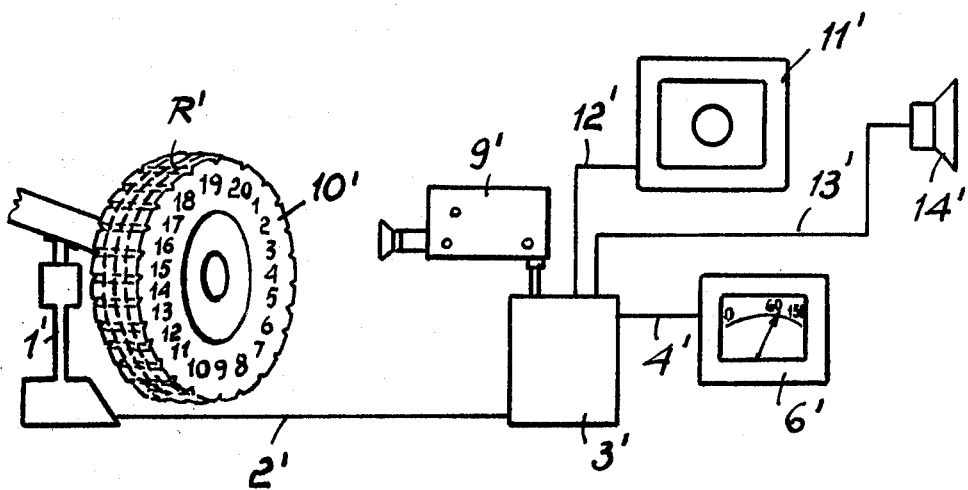
FIG. 2 is a block diagram of another embodiment of the balancing apparatus according to this invention.

Making reference now to FIG. 2, there is shown a second embodiment of the balancing apparatus according to the invention. For clarity sake, all similar elements of this second embodiment have been denoted with the same reference numerals used in the first embodiment, but with the addition of an apostrophe. The concept behind this second embodiment is that of eliminating the stroboscopic lamp 7. To this aim, the closed loop TV system comprising the TV camera 9' and monitor 11' has been connected to the pulse detector through the line 2', such as to synchronize it with the wheel rpm's. Thus, the stroboscopic lamp is no longer required, and the TV camera eye will be partly covered to see, rather than the whole wheel, only a segment thereof wherein one figure or character only will be visible which will appear on the screen at the maximum unbalance moment as stored in the unbalance indicating gauge.

Figure 3:
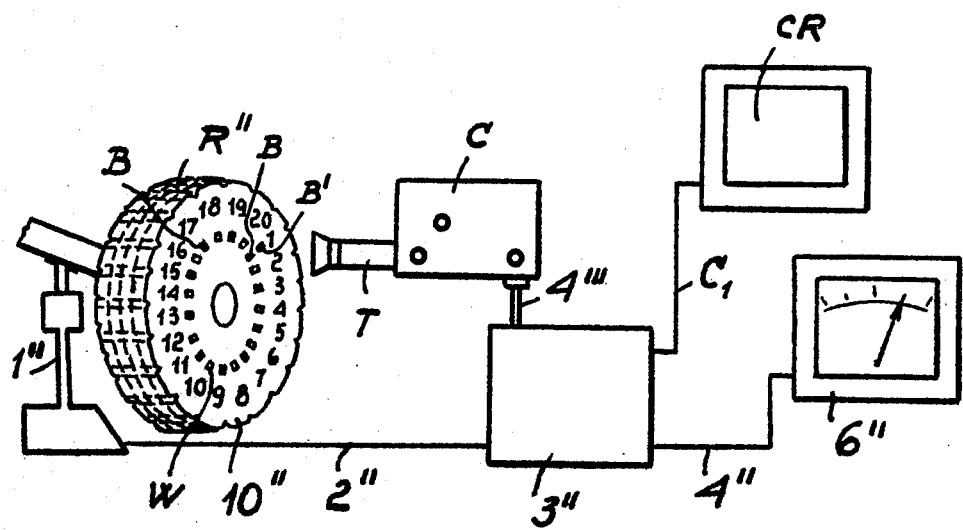
FIG. 3 is a block diagram of a further embodiment, presently preferred, of the balancing apparatus according to this invention.

With reference, now, to FIG. 3, there is shown schematically a further embodiment, and a presently preferred one, of the electronic balancer according to the invention. With reference to said FIG. 3, the balancing apparatus comprises a mechanical pulse pick-up member 1", suitably arranged in the proximity of the wheel R" to be balanced, which at each revolution of the wheel receives a blow and converts it into an electrical pulse. Such electrical pulses are transmitted, over the line 2", to the unit 3" including the apparatus control circuitry, which suitably processes said electrical pulses and sends them over the line 4" to an unbalance indicating gauge 6" and is connected through line 4'" with a photocell device C enclosing in its tubular portion T two photocells (not shown). The device C with its photocells is adapted for positioning in close proximity of the wheel R" to be balanced. The unbalance indicating gauge 6" is adapted, as mentioned previously, to store the amount of maximum unbalance. The control logics within the unit 3" also controls, through a cable C1, a digital storage-counter gauge CR. The device C, with its photocells, is pointed at a laminar ring member or circumferentially graduated dial, e.g. of paper or other material, 10", removably attached to the wheel R" to be balanced. The laminar member 10" is substantially identical to the members 10 and 10' described above, there being defined thereon a similar plurality of numerals arranged circumferentially. According to this preferred embodiment, the disc 10" comprises, however, a plurality of photoelectrically activating and disactivating marks W,B as well, which marks have different optical properties and may be, for instance, white or black marks, or colored marks. Each mark is associated with a corresponding numeral, the number of such marks and characters or numerals being any one. Said marks are spaced at equal intervals along a circumference that may be either inside or outside the circumference wherealong the numerals are arranged at equal intervals apart. Moreover, as it will be noted, at a mark B (black) another black mark B' is located wherewith the reference numeral 1 is associated on the outer circumference of the reference characters or numerals. The presence of this mark B' is a feature of this embodiment of the invention, as it will appear hereinafter. It should be noted that, although in the drawings the marks W and B have been shown as white and black areas, respectively, they may be of any photoelectrically activating and disactivating color as appropriate to alternatively cause the energizing and de-energizing of the photocells contained in the tubular member T.

This embodiment of the balancing apparatus operates as follows. After positioning the disc 10" on the wheel R" to be balanced, the latter is caused to rotate with the tubular member T containing the two photocells close to the disc 10". Inside the tubular member T, the photocells will be positioned such that one of them is collimated with the inner circumference of marks W,B, and the other with the isolated black mark B'. Obviously, when the wheel R' rotates, the collimation of the second photocell and the isolated mark B' will occur once at every revolution of the wheel. The control circuitry 3" is such that the energizing of the second photocell due to collimation of the wheel with the mark B' at each revolution determines the energizing of the first photocell which, at every revolution, will be energized and de-energized a number of times equal respectively to the number of black marks and white marks, the energizations and/or de-energizations of this photocell being "counted" by the digital gauge CR also driven by the circuitry 3". It will be apparent that the count of the gauge CR is reset to zero at every revolution, i.e. as the second photocell re-collimates with the isolated mark B'. More specifically, the gauge CR, in addition to counting the energizations/de-energizations of the first photocell is also effective to store the figure relative to the count at the moment of maximum unbalance as indicated, like in the previously described embodiments, by the gauge 6", which gauge 6" may be calibrated in grams. In this manner, it becomes possible to balance the wheel R" by simply observing two gauges only, which, if desired, may be included in a single housing body, or by observing a dual scale single gauge. The advantages of this preferred embodiment of the invention are evident. The traditional chalk mark is replaced by the laminar ring member or disc attached to the wheel, the operator is no longer required, as in other apparata, to detect on the wheel the position of said mark at the moment of maximum unbalance or, as in other apparata employing photoelectric cells, to detect this position on a 0°–360° gauge and transfer this position onto the wheel, but simply to read on the indicating gauge CR the number, corresponding to one of those marked on the disc attached to the wheel, at which the counterweight will be applied the gram weight whereof appears indicated on the gauge 6".

From the above description, it will be apparent that a balancing apparatus has been provided which is extremely simple, reliable and economical, and which constitutes a remarkable improvement over the mounted wheel balancing apparata presently marketed.

As explained above the detector or pick-up member 1 is per se known in the art and is manufactured e.g. by the following West-German companies: (1) Gebr. Hoffmann K.G. Spezialfabrik fur Auswuchtmaschinen of 61 Darmstadt, West Germany. Good results have been obtained with the Finishbalancer Type FB-PK pick-up member of this firm. (2) Beissbarth, Fabrik fur Moderne Werkstatteausrustungen of Hannoverstrasse 101, Munich, West Germany. In using a pick-up member models 9153 W 300 and 9154 W 310 good results have been obtained.

Prior art finishbalancers mentioned in the chapter "Background of the Invention" are manufactured e.g. by the following U.S. Company: Alemite a Division of Steward Warner Corporation of 1826 Diversey Parkway Chicago, Ill.

The invention as herein described is susceptible of other variations and modifications within the scope of the present inventive concept. For example, in the preferred embodiment, the photocells may be replaced with light emitter elements effective to energize phototransistors. In this case, the marks on the disc to be positioned on the wheel may, for instance, be made from an alternatively reflecting and non-reflecting material. Furthermore the expression such "photoelectrical" as used in this specification should be considered to be equivalent to any analogous system involving in general electromagnetic or magnetic radiations. Therefore, the above description is merely illustrative of the invention the scope whereof is defined in the accompanying claims which follow.

I claim:

1. An apparatus for determining the amount and location of unbalance in a rotating wheel of a vehicle while the wheel is mounted on the vehicle, comprising a mechanical pulse pick-up means responsive to the vibrations of the wheel to be balanced, said pick-up means being effective to convert mechanical pulses into electrical pulses, a circumferentially graduated dial adaped for removable attachment to said wheel centrally thereof for rotation therewith, said dial having a plurality of alternatingly photoelectrically activating and disactivating marks distributed over a circumference, a photocell device responsive to alternating photoelectrical activation and disactivation induced by said plurality of marks, an unbalance indicating gauge capable of indicating the amount of unbalance of the wheel to be balanced, a digital storage counter and an apparatus control circuitry unit adapted to process the electrical pulses received from said pick-up means and said photocell device and to send them to said unbalance indicating gauge and to said digital storage counter, said digital storage counter being adapted to count the energization and de-energization of said other photocell by said plurality of marks and to store the figure corresponding to one of said marks at the maximum unbalance as indicated by said unbalance indicating gauge, thereby allowing an operator to read simultaneously said figure of maximum unbalance indicated by said digital storage counter and the amount of maximum unbalance indicated by said unbalance indicating gauge.

2. An apparatus according to claim 1, wherein said circumferentially graduated dial has in addition to said plurality of marks distributed over a circumference an additional photoelectrically activating mark energizing said photocell device to induce said digital storage counter through the processing action of said circuitry unit to reset to zero every time said additional photoelectrically activating mark is in collimation relationship with said photocell device.

* * * * *